US012672026B2

(12) United States Patent
Sanders et al.

(10) Patent No.: US 12,672,026 B2
(45) Date of Patent: Jun. 30, 2026

(54) SYSTEMS AND METHODS FOR A SERVICE AWARE MEASUREMENT GAP

(71) Applicant: Verizon Patent and Licensing Inc., Basking Ridge, NJ (US)

(72) Inventors: Susan Wu Sanders, Bridgewater, NJ (US); Jin Yang, Orinda, CA (US); Maria G. Lam, Irvine, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 331 days.

(21) Appl. No.: 18/067,255

(22) Filed: Dec. 16, 2022

(65) Prior Publication Data

US 2024/0205734 A1    Jun. 20, 2024

(51) Int. Cl.
*H04W 28/02* (2009.01)

(52) U.S. Cl.
CPC ... *H04W 28/0273* (2013.01); *H04W 28/0268* (2013.01)

(58) Field of Classification Search
CPC ......... H04W 28/0273; H04W 28/0268; H04W 24/02; H04W 24/04; H04W 24/10
See application file for complete search history.

(56) References Cited

U.S. PATENT DOCUMENTS

| | | | | |
|---|---|---|---|---|
| 2017/0201987 A1* | 7/2017 | Huang | .................. | H04W 16/32 |
| 2019/0174343 A1* | 6/2019 | Cui | ..................... | H04W 72/1268 |
| 2021/0367741 A1* | 11/2021 | Yiu | ......................... | H04L 5/0007 |
| 2022/0053450 A1* | 2/2022 | Khoryaev | ............. | H04L 5/0048 |
| 2023/0057211 A1* | 2/2023 | Min | ..................... | H04W 56/001 |
| 2023/0134401 A1* | 5/2023 | Hu | .................... | H04W 36/0088 370/252 |
| 2023/0362696 A1* | 11/2023 | Li | ........................ | H04W 24/08 |
| 2023/0362699 A1* | 11/2023 | Yerramalli | ............ | H04W 24/10 |
| 2023/0370181 A1* | 11/2023 | Rydén | .................. | H04B 17/336 |
| 2024/0015781 A1* | 1/2024 | Jacobsen | ........... | H04W 28/0268 |
| 2024/0172021 A1* | 5/2024 | Hong | ...................... | H04W 8/22 |
| 2024/0235756 A1* | 7/2024 | Futaki | ................. | H04W 36/165 |
| 2024/0334228 A1* | 10/2024 | Keating | ................ | H04W 4/025 |
| 2024/0422602 A1* | 12/2024 | Tao | ........................ | H04W 8/24 |

FOREIGN PATENT DOCUMENTS

CN        107493588 B  *  5/2021

* cited by examiner

*Primary Examiner* — Sudesh M. Patidar

(57) ABSTRACT

In some implementations, a radio access network (RAN) device may determine service information associated with a user equipment (UE). The service information may be associated with a service to be received by the UE. The RAN device may select a measurement gap configuration based on the service information associated with the UE. The RAN device may transmit the measurement gap configuration for reception by the UE.

20 Claims, 5 Drawing Sheets

100

152
Select measurement gap configuration based on service information

150
Service information associated with UE service

| UE 105 | | RAN 110 |

154
Measurement gap configuration

152
Select measurement gap configuration based on service information

RAN
110

150
Service information associated with UE service

154
Measurement gap configuration

UE
105

100

| Gap Pattern Identifier | Measurement Gap Length (MGL, ms) | Measurement Gap Repetition Period (MGRP, ms) |
|---|---|---|
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |

400

410 Determine service information associated with a user equipment (UE)

420 Select a measurement gap configuration based at least in part on the service information associated with the UE 430 Transmit the measurement gap configuration for reception by the UE

SYSTEMS AND METHODS FOR A SERVICE AWARE MEASUREMENT GAP

BACKGROUND

In a wireless communication system, a user equipment (UE) may be configured with a measurement gap. A measurement gap enables the UE to, for example, perform one or more measurements that cannot be completed by the UE while the UE is tuned to a current serving cell. A measurement gap can interrupt both uplink communication and downlink communication, meaning that the use of the measurement gap can impact performance by, for example, increasing jitter and reducing throughput.

DETAILED DESCRIPTION OF EXAMPLE EMBODIMENTS

Figure 1A:
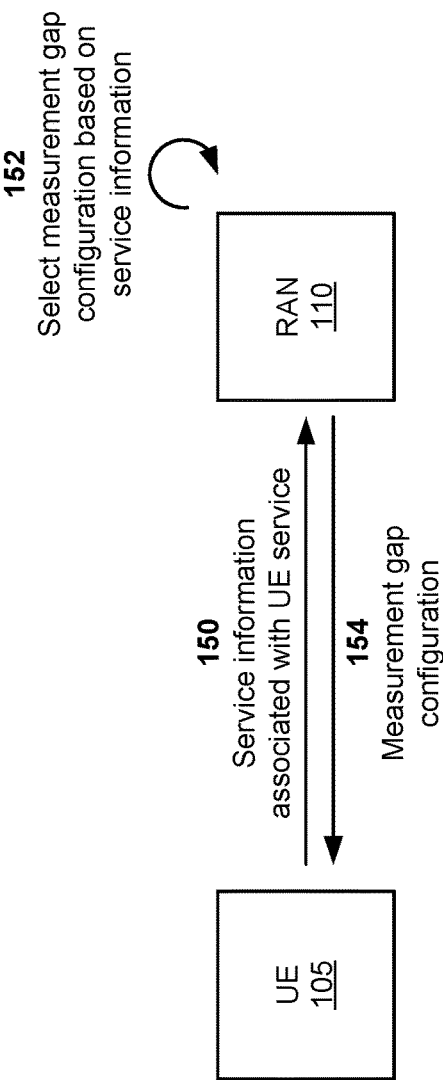
FIGS. 1A and 1B are diagrams of examples associated with a service aware measurement gap.

The following detailed description of example implementations refers to the accompanying drawings. The same reference numbers in different drawings may identify the same or similar elements.

In some wireless communication systems, such as a New Radio (NR) system, a measurement gap is needed for inter-frequency measurements, such as a measurement of a neighbor cell in another frequency. A measurement gap may also be needed for an intra-frequency measurements. For example, within frequency range 2 (FR2), the UE may use analog beamforming, with a UE beam typically being directed toward the serving cell. However, a measurement of a neighbor cell may require the UE beam to be directed toward the neighbor cell. Here, a measurement gap is needed for the UE to redirect the UE beam and temporarily stop transmitting or receiving communications with the serving cell. As another example, a UE may be configured with an active bandwidth part (BWP) that does not include an intra-frequency synchronization signal (SS)/physical broadcast channel (PBCH) block. Here, a measurement gap is needed for the UE to retune a transceiver to receive the intra-frequency SS/PBCH block (e.g., in a manner similar to retuning for the purpose of performing an inter-frequency measurement).

Measurement gaps are configured using a pattern structure that is defined by a gap offset (gapOffset), a measurement gap length (mgl), a measurement gap repetition period (mgrp), and a measurement gap timing advance (mgta). In some scenarios, a UE may be configured with different measurement gap patterns for frequency range 1 (FR1) and FR2. Alternatively, a single measurement gap pattern may be configured for both FR1 and FR2.

In operation, measurement gaps start during radio frames and subframes which satisfy the following criteria:

$$SFN \bmod (mgrp/10) = FLOOR \ (gapOffset/10)$$

$$\text{Subframe} = \text{gapOffset} \bmod 10$$

where gapOffset can be configured with a value from 0 to (mgrp-1). As one example, if mgrp is configured with a value of 40 milliseconds (ms) and gapOffset is configured with a value of 35, then measurement gaps start during subframe 5 of system frame number (SFN) 3, 7, 11 15, 19, and so on. The duration of each measurement gap is defined by mgl, which can have a value from, for example, 1.5 ms to 6 ms.

In some systems, the UE may be configured with a set of predefined measurement gap patterns, with each measurement gap pattern in the set being defined based on a different combination of mgl and mgrp. An example of a table of predefined measurement gap patterns is shown and described below with respect to FIG. 1B. In practice, a RAN device (e.g., a device included in a RAN, such as a base station) transmits, and a UE receives an indication of a predefined measurement gap pattern to be used by the UE.

However, suitability of a given measurement gap pattern may depend on a service being provided to the UE. For example, a first measurement gap pattern may be suitable in association with providing an enhanced mobile broadband (eMBB) service but, due to jitter and gaps in data communication, the first measurement gap pattern may not be suitable in association with providing a low latency service (e.g., an ultra-reliable low latency communication (URLLC) service, a critical Internet-of-Things (IoT) service, or the like). In such a case, a second measurement gap pattern with comparatively shorter gap length and a comparatively longer periodicity could reduce data gaps and lower jitter and therefore could be more suitable for the low latency service. However, the second measurement gap pattern would increase an amount of time needed by the UE to perform a neighbor cell measurement (due to the longer interval between measurements), and therefore may not be suitable in a high mobility scenario. Thus, awareness of information related to a service being provided to the UE could enable improved measurement gap pattern selection in a given scenario.

Figure 1B:
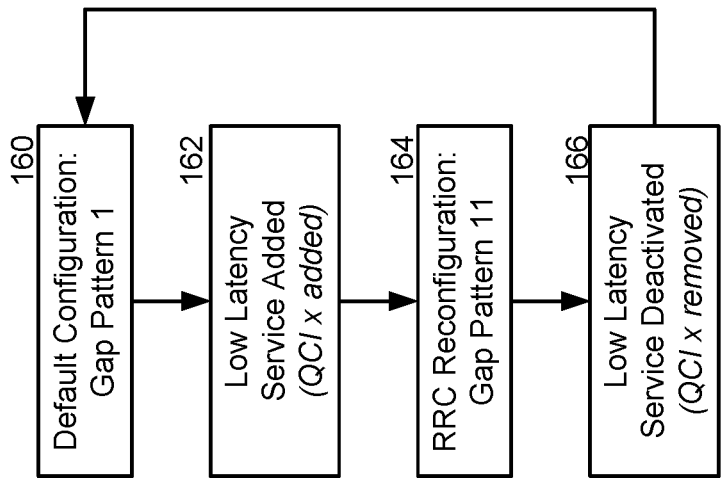

Some implementations described herein enable a service aware measurement gap. In some implementations, a radio access network (RAN) device (e.g., a base station in a RAN) may determine service information associated with a UE. Here, the service information may include information associated with a service to be received by the UE. The RAN device may select a measurement gap configuration based on the service information, and may transmit the measurement gap configuration for reception by the UE. In this way, a RAN device may select a measurement gap configuration (e.g., a measurement gap pattern) based on information associated with the service to be provided to the UE. For example, if the service information indicates that the UE is to receive an eMBB service, then the RAN device may select a measurement gap configuration optimized for high throughput (e.g., rather than low latency and high reliability). As another example, if the service information indicates that the UE is to receive a low latency service, then the RAN device may select a measurement gap configuration optimized for low latency and high reliability (e.g., rather than high throughput). As a result, improved measurement gap pattern selection may be achieved in a given scenario, which can provide reduced jitter, reduced latency, or increased throughput, among other examples, and, more generally, improve overall network performance. Additional details are provided below:

FIGS. 1A and 1B are diagrams of examples associated with a service aware measurement gap. As shown in FIG. 1A, an example 100 includes communication between a UE 105 and a RAN 110. The RAN 110 may include a RAN including one or more devices such as one or more base stations, one or more network nodes, or one or more other types of network entities. In some implementations, the UE 105 and the RAN 110 may communicate via a wireless access link, which may include an uplink and a downlink.

As shown at reference 150 in FIG. 1A, the RAN 110 may determine service information associated with the UE 105. For example, the UE 105 may transmit, and the RAN 110 may receive, service information associated with the UE 105. In some implementations, the UE 105 may transmit the service information in response to a request from the RAN 110 (e.g., the RAN 110 may request the service information so that the RAN 110 can select a measurement gap configuration). As another example, the RAN 110 may determine the service information based on information stored or accessible by the RAN 110 (e.g., information stored by the RAN 110 that indicates one or more services to be received by the UE 105).

The service information includes information associated with a service to be received by the UE 105 (e.g., a service to be provided to the UE 105 by the RAN 110). For example, the service information may include information indicating a type of the service to be received by the UE 105. The type of service may be, for example, an eMBB service, a URLLC service, a low latency service, or a critical IoT service, among other examples.

As another example, the service information may include information indicating a quality of service class identifier (QCI) associated with the service. That is, the service information may indicate a QCI that points to a set of quality of service (QoS) characteristics to be applied to the service to be provided to the UE 105.

As another example, the service information may include information indicating a number of frequency bands associated with the service. That is, the service information may indicate a number of frequency bands to be used by the UE 105 in association with receiving the service.

As another example, the service information may include information indicating a BWP associated with the service. That is, the service information may indicate one or more BWPs to be used by the UE 105 in association with receiving the service.

As another example, the service information may include information indicating a UE group associated with the service. That is, the service information may indicate a group of UEs to which the UE 105 is assigned in association with receiving the service.

As another example, the service information may include information indicating a QoS flow associated with the service. That is, the service information may indicate a QoS flow to be used for providing the service to the UE 105.

As another example, the service information may include information indicating a network slice associated with the service. That is, the service information may indicate a network slice via which the service is to be provided to the UE 105.

As shown at reference 152, the RAN 110 may select a measurement gap configuration based on the service information associated with the UE 105. The measurement gap configuration is a configuration that indicates one or more characteristics associated with implementation of measurement gaps by the UE 105.

For example, the measurement gap configuration may include information indicating one or more characteristics of a measurement gap pattern, such as a gap offset (e.g., gapOffset), a measurement gap length (e.g., mgl), a measurement gap periodicity (e.g., mgrp), a measurement gap timing advance (e.g., mgta), or the like. In some implementations, the measurement gap configuration may include a measurement gap pattern identifier. The measurement gap pattern identifier may correspond to a predefined measurement gap pattern in a set of predefined measurement gap patterns configured on the UE 105, with the indicated predefined measurement gap pattern indicating one or more measurement gap characteristics (e.g., mgl, mgrp, or the like).

In some implementations, the measurement gap configuration may include a measurement gap activation or a measurement gap deactivation. A measurement gap activation is an indication that measurement gaps are to be implemented by the UE 105 (e.g., such that the UE 105 utilizes measurement gaps according to a measurement gap pattern indicated in the measurement gap configuration). A measurement gap deactivation is an indication that measurement gaps are not to be implemented by the UE 105 (e.g., such that the UE 105 does not utilize measurement gaps). A measurement gap deactivation may be used if, for example, the service information indicates that the UE 105 operates in a single frequency band (e.g., since measurement on other frequencies would not be needed). In another example, a measurement gap deactivation may be used if the service information indicates another particular characteristic, such as a particular QCI, a particular BWP, or the like. In this way, measurement gap deactivation can be implemented on a per-QCI basis or a per-BWP basis, thereby improving control of measurement gap deactivation by the RAN 110.

In some implementations, the RAN 110 may select the measurement gap configuration based on the service information. For example, the RAN 110 may determine that the service information indicates a particular service type (e.g., URLLC) and may select a particular measurement gap configuration based on the service information indicating the particular service type (e.g., when the RAN 110 is configured to select the particular measurement gap configuration for the particular service). In some implementations, the RAN 110 may select the measurement gap configuration based on one or more items of service information.

In some implementations, the RAN 110 may select the measurement gap configuration based on an algorithm that receives one or more items of service information (e.g., QCI, a number of frequency bands, or the like) as input and provides information associated with the measurement gap configuration (e.g., a measurement gap pattern identifier) as output. For example, the RAN 110 may be configured with an algorithm that receives a service type and QCI as input and provides a measurement gap pattern identifier as output.

In some implementations, the RAN 110 may compute a value for a measurement gap characteristic. For example, the RAN 110 may be configured to compute a value of a measurement gap characteristic (e.g., a measurement gap length) based on a number of frequency bands to be used for providing the service and a bandwidth of the frequency bands to be used for providing the service. The RAN 110 may then include an indication of the value of the computed measurement gap characteristic in the measurement gap configuration.

As shown at reference 154, the RAN 110 may transmit the measurement gap configuration for reception by the UE 105. For example, the RAN 110 may in some implementations transmit the measurement gap configuration via radio resource control (RRC) signaling.

In some implementations, the RAN 110 may select an updated measurement gap configuration (after transmitting the measurement gap configuration). For example, the RAN 110 may receive updated service information associated with the UE 105. The updated service information may indicate, for example, updated information associated with the service or information associated with another (additional or different) service to be received by the UE 105. In such a scenario, the RAN 110 may select an updated measurement gap configuration based on the updated service information (e.g., in a manner similar to that described above with respect to reference 152). The RAN 110 may then transmit the updated measurement gap configuration for reception by the UE 105

FIG. 1B illustrates a particular example associated with a service aware measurement gap as described above with respect to FIG. 1A. In the example shown in FIG. 1B, a UE 105 is configured with a set of measurement gap patterns, each associated with a different measurement gap pattern identifier and indicating a measurement gap length and a measurement gap repetition period. At reference 160, the RAN 110 configures the UE 105 with a default measurement gap configuration—a measurement gap pattern indicated by measurement gap pattern identifier 1.

At reference 162, the RAN 110 determines service information indicating that the UE 105 is to receive a low latency service, where the low latency service is associated with a QCI x (e.g., to indicate that a particular set of QoS characteristics is to be applied to the service). In this example, the RAN 110 is configured to select a measurement gap pattern indicated by measurement gap pattern identifier 11 as a measurement gap pattern to be implemented when the UE 105 is receiving the low latency service associated with the QCI x. Thus, as shown by reference 164, the RAN 110 selects a measurement gap configuration including the measurement gap pattern identifier 11. The RAN 110 then transmits the measurement gap configuration (e.g., via an RRC reconfiguration message) to the UE 105.

At reference 166, the RAN 110 determines updated service information indicating that the UE 105 is no longer receiving the low latency service (e.g., that the low latency service has been deactivated such that the QCI x is removed). In this example, the RAN 110 is configured to select a measurement gap pattern indicated by the default measurement gap pattern identifier 1 as a measurement gap pattern to be implemented when the UE 105 is no longer receiving the low latency service associated with the QCI x. Thus, as shown, the RAN 110 selects an updated measurement gap configuration including the measurement gap pattern identifier 1 and transmits an updated measurement gap configuration (e.g., via another RRC reconfiguration message) to the UE 105.

In this way, the RAN 110 may select a measurement gap configuration based on information associated with a service to be provided to the UE 105, thereby enabling improved measurement gap pattern selection in a given scenario so as to, for example, reduce jitter, reduce latency, increase throughput and, more generally, improve overall network performance.

As indicated above, FIGS. 1A and 1B are provided as examples. Other examples may differ from what is described with regard to FIGS. 1A and 1B. The number and arrangement of devices shown in FIGS. 1A and 1B are provided as an example. In practice, there may be additional devices, fewer devices, different devices, or differently arranged devices than those shown in FIGS. 1A and 1B. Furthermore, two or more devices shown in FIGS. 1A and 1B may be implemented within a single device, or a single device shown in FIGS. 1A and 1B may be implemented as multiple, distributed devices. Additionally, or alternatively, a set of devices (e.g., one or more devices) shown in FIGS. 1A and 1B may perform one or more functions described as being performed by another set of devices shown in FIGS. 1A and 1B.

Figure 2:
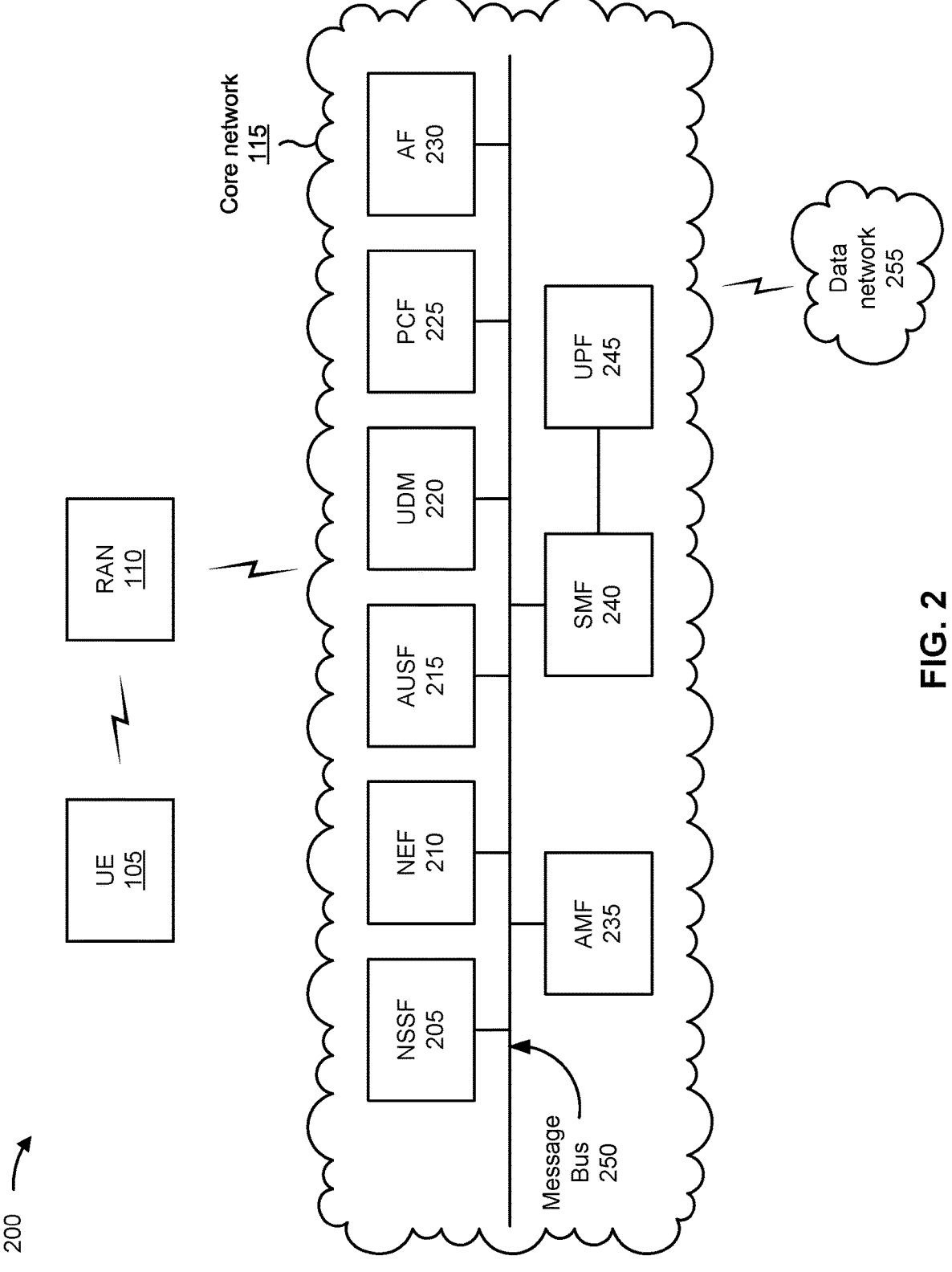
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include a UE 105, a RAN 110, a core network 115, and a data network 255. Devices and/or networks of example environment 200 may interconnect via wired connections, wireless connections, or a combination of wired and wireless connections.

UE 105 includes one or more devices capable of receiving, generating, storing, processing, and/or providing information, such as information described herein. For example, UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

RAN 110 may support, for example, a cellular radio access technology (RAT). RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for UE 105. RAN 110 may transfer traffic between UE 105 (e.g., using a cellular RAT), one or more base stations (e.g., using a wireless interface or a backhaul interface, such as a wired backhaul interface), and/or core network 115. RAN 110 may provide one or more cells that cover geographic areas.

In some implementations, RAN 110 may perform scheduling and/or resource management for UE 105 covered by RAN 110 (e.g., UE 105 covered by a cell provided by RAN 110). In some implementations, RAN 110 may be controlled or coordinated by a network controller, which may perform load balancing, network-level configuration, and/or other operations. The network controller may communicate with RAN 110 via a wireless or wireline backhaul. In some implementations, RAN 110 may include a network controller, a self-organizing network (SON) module or component, or a similar module or component. In other words, RAN 110 may perform network control, scheduling, and/or network management functions (e.g., for uplink, downlink, and/or sidelink communications of UE 105 covered by RAN 110).

In some implementations, core network 115 may include an example functional architecture in which systems and/or methods described herein may be implemented. For example, core network 115 may include an example architecture of a fifth generation (5G) next generation (NG) core network included in a 5G wireless telecommunications system. While the example architecture of core network 115 shown in FIG. 2 may be an example of a service-based architecture, in some implementations, core network 115 may be implemented as a reference-point architecture and/or a 4G core network, among other examples.

As shown in FIG. 2, core network 115 may include a number of functional elements. The functional elements may include, for example, a network slice selection function (NSSF) 205, a network exposure function (NEF) 210, an authentication server function (AUSF) 215, a unified data management (UDM) component 220, a policy control function (PCF) 225, an application function (AF) 230, an access and mobility management function (AMF) 235, a session management function (SMF) 240, and/or a user plane function (UPF) 245. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

NSSF 205 includes one or more devices that select network slice instances for UE 105. By providing network slicing, NSSF 205 allows an operator to deploy multiple substantially independent end-to-end networks potentially with the same infrastructure. In some implementations, each slice may be customized for different services.

NEF 210 includes one or more devices that support exposure of capabilities and/or events in the wireless telecommunications system to help other entities in the wireless telecommunications system discover network services.

AUSF 215 includes one or more devices that act as an authentication server and support the process of authenticating UE 105 in the wireless telecommunications system.

UDM 220) includes one or more devices that store user data and profiles in the wireless telecommunications system. UDM 220 may be used for fixed access and/or mobile access in core network 115.

PCF 225 includes one or more devices that provide a policy framework that incorporates network slicing, roaming, packet processing, and/or mobility management, among other examples.

AF 230) includes one or more devices that support application influence on traffic routing, access to NEF 210, and/or policy control, among other examples.

AMF 235 includes one or more devices that act as a termination point for non-access stratum (NAS) signaling and/or mobility management, among other examples.

SMF 240 includes one or more devices that support the establishment, modification, and release of communication sessions in the wireless telecommunications system. For example, SMF 240) may configure traffic steering policies at UPF 245 and/or may enforce user equipment IP address allocation and policies, among other examples.

UPF 245 includes one or more devices that serve as an anchor point for intraRAT and/or interRAT mobility. UPF 245 may apply rules to packets, such as rules pertaining to packet routing, traffic reporting, and/or handling user plane QoS, among other examples.

Message bus 250 represents a communication structure for communication among the functional elements. In other words, message bus 250 may permit communication between two or more functional elements.

Data network 255 includes one or more wired and/or wireless data networks. For example, data network 255 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
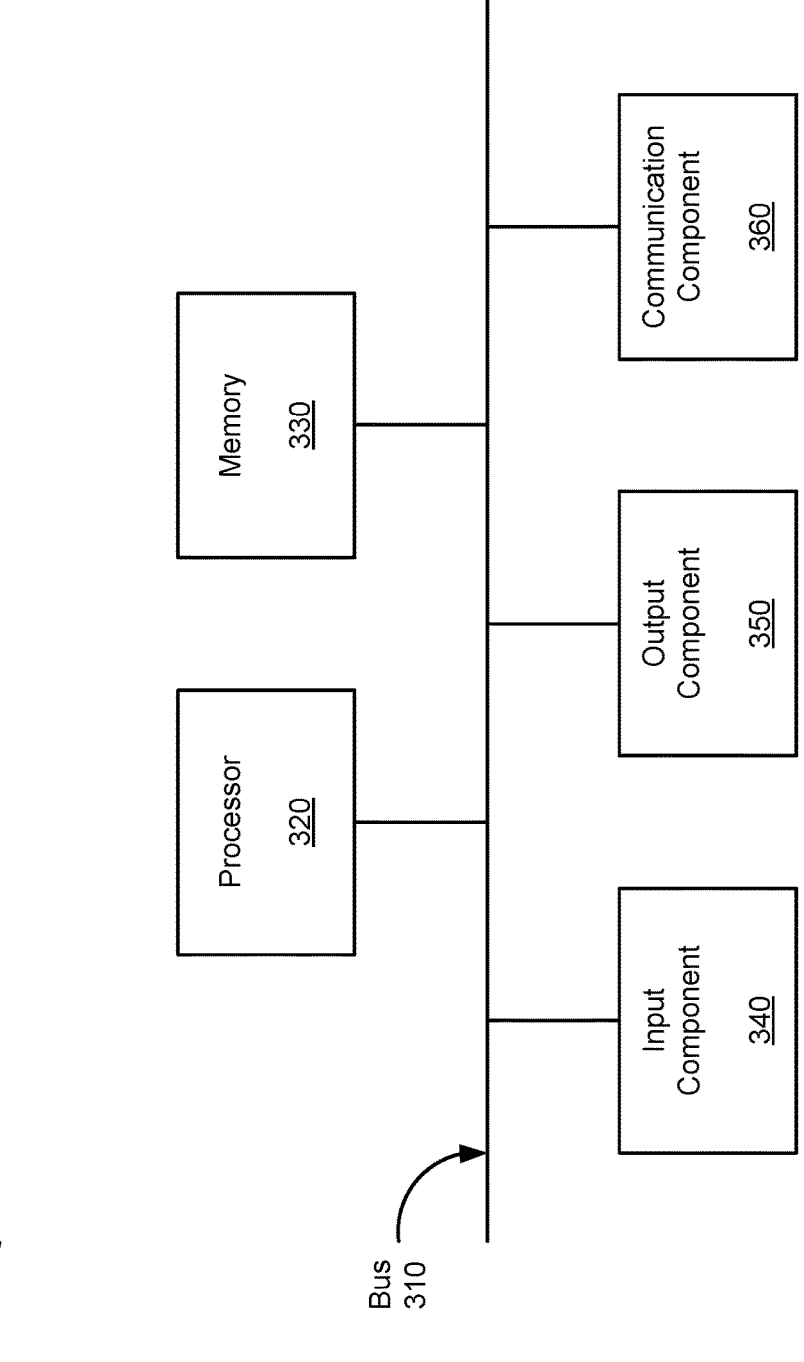
FIG. 3 is a diagram of example components of a device associated with a service aware measurement gap.

FIG. 3 is a diagram of example components of a device 300 associated with a service aware measurement gap. The device 300 may correspond to a UE 105 and/or a RAN 110 (e.g., a RAN device included in the RAN 110). In some implementations, the UE 105 and/or the RAN 110 may include one or more devices 300 and/or one or more components of the device 300. As shown in FIG. 3, the device 300 may include a bus 310, a processor 320, a memory 330, an input component 340, an output component 350), and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
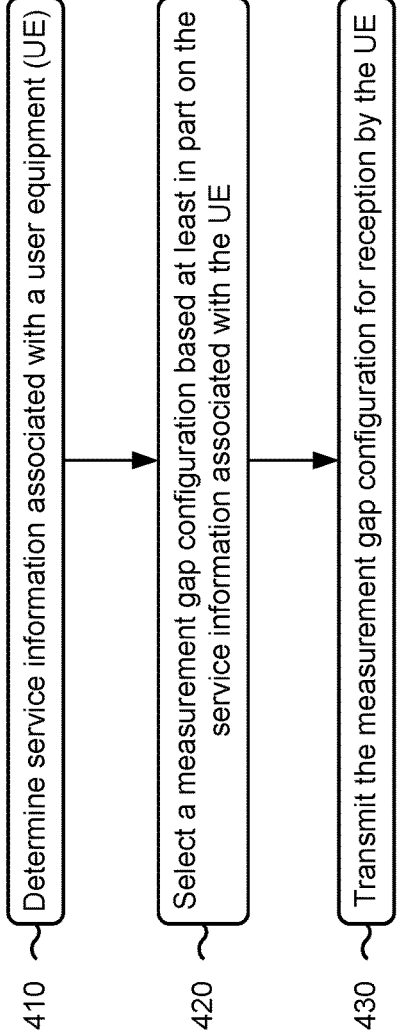
FIG. 4 is a flowchart of an example process associated with a service aware measurement gap.

FIG. 4 is a flowchart of an example process 400 associated with a service aware measurement gap. In some implementations, one or more process blocks of FIG. 4 may be performed by a RAN device (e.g., a device included in a RAN 110). In some implementations, one or more process blocks of FIG. 4 may be performed by one or more components of device 300, such as processor 320, memory 330, input component 340, output component 350, and/or communication component 360.

As shown in FIG. 4, process 400 may include determining service information associated with a UE (block 410). For example, the RAN device may determine service information associated with a UE (e.g., a UE 105). In some implementations, the service information may be associated with a service to be received by the UE, as described above.

In some implementations, the service information indicates a type of the service.

Additionally, or alternatively, the service information may in some implementations indicate a QCI associated with the service.

In some implementations, the service information indicates a number of frequency bands associated with the service.

Additionally, or alternatively, the service information may in some implementations indicate a bandwidth part associated with the service.

In some implementations, the service information indicates at least one of a UE group associated with the service, a QoS flow associated with the service, or a network slice associated with the service.

As further shown in FIG. 4, process 400 may include selecting a measurement gap configuration based on the service information associated with the UE (block 420). For example, the RAN device may select a measurement gap configuration based on the service information associated with the UE, as described above.

In some implementations, the measurement gap configuration includes information indicating a measurement gap length.

Additionally, or alternatively, the measurement gap configuration may in some implementations include information indicating a measurement gap periodicity.

In some implementations, the measurement gap configuration includes a measurement gap pattern identifier.

In some implementations, the measurement gap configuration includes a measurement gap activation.

Alternatively, the measurement gap configuration may in some implementations include a measurement gap deactivation.

In some implementations, selecting the measurement gap configuration comprises computing a value for a measurement gap characteristic based on the service information.

As further shown in FIG. 4, process 400 may include transmitting the measurement gap configuration for reception by the UE (block 430). For example, the RAN device may transmit the measurement gap configuration for reception by the UE, as described above.

In some implementations, the measurement gap configuration is transmitted via RRC signaling.

In some implementations, process 400 includes receiving updated service information associated with the UE, selecting an updated measurement gap configuration based on the updated service information, and transmitting the updated measurement gap configuration for reception by the UE.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
obtaining, by a radio access network (RAN) device, service information associated with a user equipment (UE), the service information being associated with a service to be received by the UE;
selecting, by the RAN device, a measurement gap configuration based on analyzing two or more items of the service information associated with the UE as input and providing information associated with the measurement gap configuration as output,
wherein the service information indicates at least one of:
a number of frequency bands to be used for providing the service and indicates a bandwidth of the frequency bands to be used for providing the service,
a UE group associated with the service,
a quality of service (QoS) flow associated with the service, or
a network slice associated with the service; and
transmitting, by the RAN device, the measurement gap configuration for reception by the UE.

2. The method of claim 1, wherein the service information further indicates a type of the service.

3. The method of claim 1, wherein the service information further indicates a quality of service class identifier (QCI) associated with the service.

4. The method of claim 1, wherein the measurement gap configuration includes information indicating a measurement gap length.

5. The method of claim 1, wherein the measurement gap configuration includes information indicating a measurement gap periodicity.

6. The method of claim 1, wherein the measurement gap configuration includes a measurement gap pattern identifier.

7. The method of claim 1, wherein the measurement gap configuration includes a measurement gap activation.

8. The method of claim 1, wherein the measurement gap configuration includes a measurement gap deactivation.

9. The method of claim 1, wherein selecting the measurement gap configuration comprises computing a value for a measurement gap characteristic based on the service information.

10. The method of claim 1, wherein the measurement gap configuration is transmitted via radio resource control (RRC) signaling.

11. The method of claim 1, further comprising:
receiving, by the RAN, updated service information associated with the UE;
selecting an updated measurement gap configuration based on the updated service information; and
transmitting the updated measurement gap configuration for reception by the UE.

12. The method of claim 1, wherein transmitting the measurement gap configuration comprises:
transmitting the measurement gap configuration via radio resource control (RRC) signaling.

13. The method of claim 1, further comprising:
determining the service information based on information stored by the RAN that indicates one or more services to be received by the UE.

14. A radio access network (RAN) device, comprising:
one or more processors configured to:
obtain service information associated with a user equipment (UE), the service information being associated with a service to be received by the UE;
select a measurement gap configuration based on receiving two or more items of the service information associated with the UE as input and provide information associated with the measurement gap configuration as output,
wherein the service information indicates a number of frequency bands to be used for providing the service and indicates a bandwidth of the frequency bands to be used for providing the service, and
wherein the service information indicates at least one of:
a UE group associated with the service,
a quality of service (QoS) flow associated with the service, or
a network slice associated with the service; and
transmit the measurement gap configuration for reception by the UE.

15. The RAN device of claim 14, wherein the service information further indicates at least one of:
a type of the service, or
a quality of service class identifier (QCI) associated with the service.

16. The RAN device of claim 14, wherein the measurement gap configuration includes information indicating at least one of a measurement gap length or a measurement gap periodicity.

17. The RAN device of claim 14, wherein the measurement gap configuration includes a measurement gap pattern identifier.

18. The RAN device of claim 14, wherein the one or more processors, to select the measurement gap configuration, are configured to compute a value for a measurement gap characteristic based on the service information.

19. A non-transitory computer-readable medium storing a set of instructions, the set of instructions comprising:

one or more instructions that, when executed by one or more processors of a radio access network (RAN) device, cause the RAN device to:

obtain service information associated with a user equipment (UE), the service information being associated with a service to be received by the UE;

select a measurement gap configuration based on an algorithm that receives two or more items of the service information associated with the UE as input and provide information associated with the measurement gap configuration as output, wherein the service information indicates a number of frequency bands to be used for providing the service and indicates a bandwidth of the frequency bands to be used for providing the service, and wherein the service information indicates at least one of:

a UE group associated with the service, a quality of service (QoS) flow associated with the service, or a network slice associated with the service; and transmit the measurement gap configuration for reception by the UE.

20. The non-transitory computer-readable medium of claim 19, wherein the service information further indicates at least one of:

a type of the service, or a quality of service class identifier (QCI) associated with the service.

* * * * *